United States Patent [19]

Conover

[11] 4,362,432

[45] Dec. 7, 1982

[54] FLUID WAVE ENERGY DISSIPATING AND ABSORBING STRUCTURE

[76] Inventor: Maria T. Conover, 1403 Neptune Grove Dr. East, Neptune Beach, Fla. 32233

[21] Appl. No.: 126,979

[22] Filed: Mar. 3, 1980

[51] Int. Cl.³ .......................... E02B 3/06; E02D 27/52
[52] U.S. Cl. ........................................ 405/33; 405/15; 405/21; 405/31
[58] Field of Search ................... 405/15, 16, 21–24, 405/30–34; 350/102, 286; 244/114 B; D10/114; D26/118

[56] References Cited

U.S. PATENT DOCUMENTS

| | | | |
|---|---|---|---|
| 1,500,119 | 7/1924 | Evers | 405/33 X |
| 1,878,909 | 9/1932 | Stimson | 350/102 X |
| 1,950,560 | 3/1934 | Martinek et al. | 350/102 X |
| 2,028,794 | 1/1936 | Matthes | 405/21 X |
| 2,344,302 | 3/1944 | Harza | 405/33 X |
| 3,007,539 | 11/1961 | Brewer et al. | 244/114 B X |
| 3,096,621 | 7/1963 | Danel | |
| 3,210,944 | 10/1965 | Svee | |
| 3,379,017 | 4/1968 | Kusatake | 405/33 X |
| 3,415,061 | 12/1968 | Staempfli | 405/34 |
| 3,456,446 | 7/1969 | Kusatake | 405/29 |
| 3,597,928 | 8/1971 | Pilaar | |
| 3,990,247 | 11/1976 | Palmer | |
| 4,083,190 | 4/1978 | Pey | 405/33 |
| 4,172,680 | 10/1979 | Brown | 405/21 X |
| 4,189,252 | 2/1980 | Inman | 405/33 |

FOREIGN PATENT DOCUMENTS

| | | | |
|---|---|---|---|
| 38267 | 12/1955 | Poland | 405/16 |
| 443759 | 3/1936 | United Kingdom | 350/102 |

Primary Examiner—Dennis L. Taylor
Attorney, Agent, or Firm—Finnegan, Henderson, Farabow, Garrett & Dunner

[57] ABSTRACT

A fluid wave energy dissipating and absorbing structure having at least one surface exposed to fluid wave action, said surface comprising an array of alternating three-sided pyramidal protuberances and triangular flat spaces, said protuberances and spaces being alternating in both rows and columns. Erosion caused by fluid wave action may be prevented or mitigated by erecting on a surface subject to such erosion a fluid wave energy dissipating and absorbing structure, and forming on said structure at least one surface exposed to the eroding fluid wave action, said surface comprising an array of alternating three-sided pyramidal protuberances and triangular flat spaces as above described.

23 Claims, 5 Drawing Figures

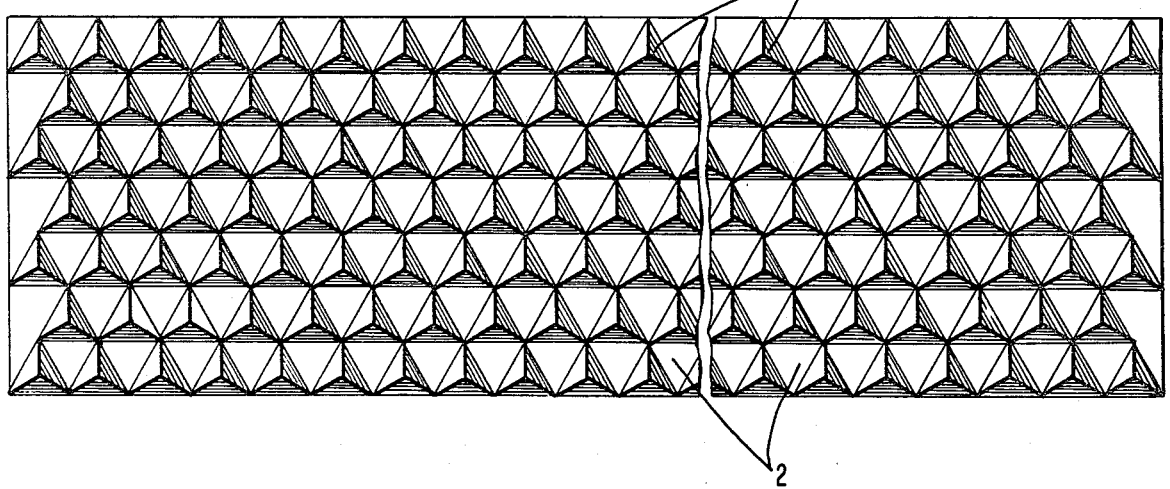
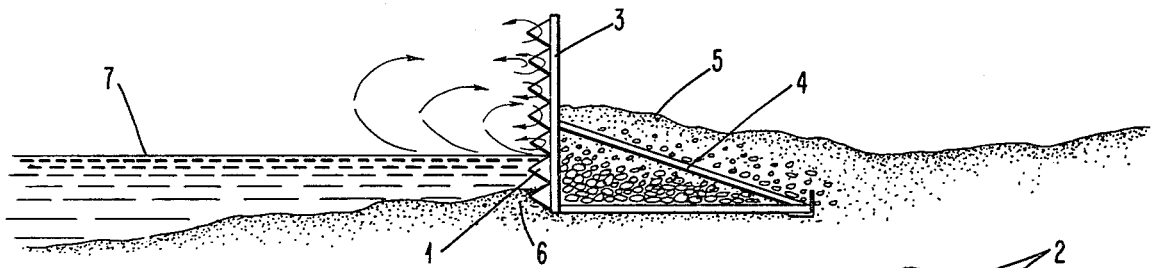
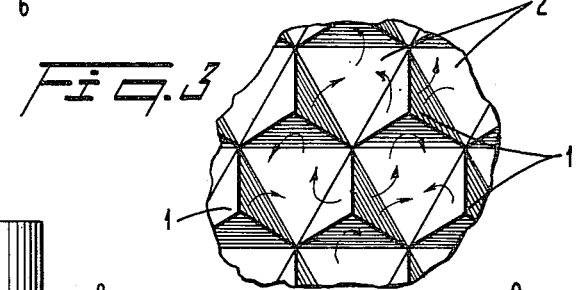
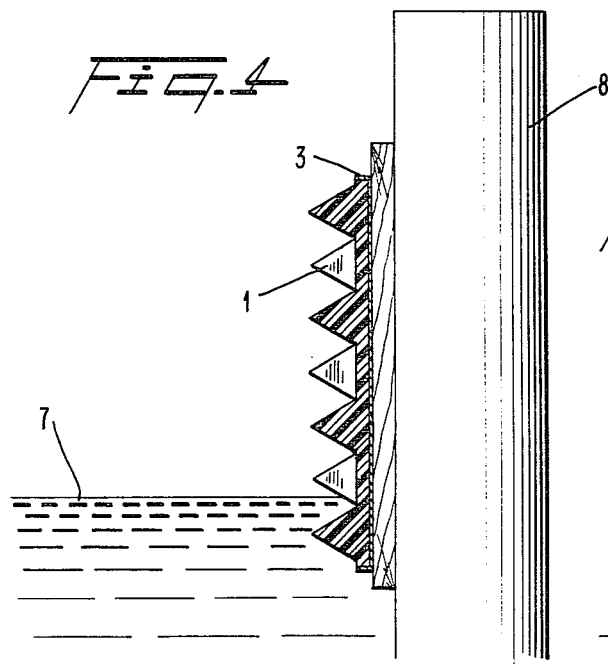
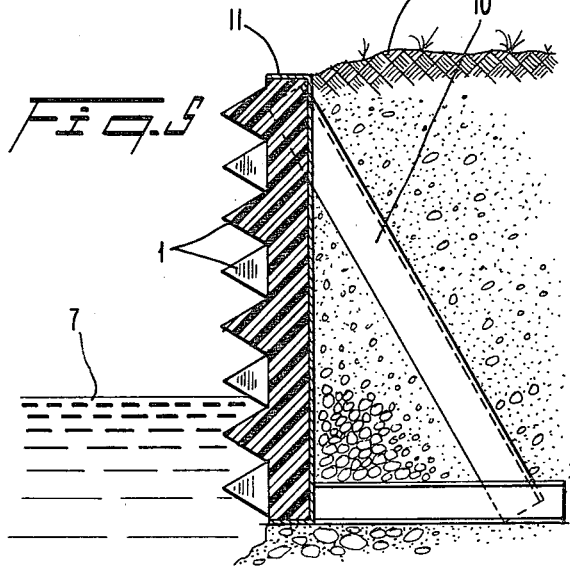

FLUID WAVE ENERGY DISSIPATING AND ABSORBING STRUCTURE

BACKGROUND OF THE INVENTION

The invention relates generally to revetments such as seawalls and other structures intended to dissipate and absorb fluid wave energy.

The erosion of beaches, lake banks, river banks and the like by wave action, either natural or as the result of passing water craft, represents a serious and long-standing problem. In an effort to prevent such erosion, numerous structures have been devised which are intended to dissipate and absorb the wave energy before it strikes and erodes beaches, banks and other riparian structures. Flat-faced seawalls are an example of such prior art structures. However, such flat structures are relatively inefficient in dissipating wave energy and, as a result, are plagued by erosion both in front of and behind the wall.

When a wave strikes a flat seawall, much of the energy may be dissipated by splashing over the wall. Water collecting behind the seawall may create destructive hydrostatic forces and results in erosion of the material behind the wall when it runs back out to the sea. Moreover, turbulence at the base of the front of a flat wall results in a general erosion of the material in front of the wall, with particularly severe erosion immediately at the base of the wall. Such erosion at the wall base may undermine the structure leading to its ultimate failure.

In order to avoid the deficiencies of flat seawalls, rocks or other assisting structures are often used in front of such walls. Further, the formation of structures which present irregular surfaces to the waves has been attempted in an effort to dissipate the wave energy more efficiently. Exemplary of such structures are the subjects of U.S. Pat. No. 2,344,302, issued Mar. 14, 1944, to L. F. Harza; U.S. Pat. No. 3,210,944, issued Oct. 12, 1965, to H. R. Svee; and U.S. Pat. No. 3,456,446, issued July 22, 1969, to S. Kusatake. With particular reference to the Harza patent, it is noted that this reference suggests revetments presenting surfaces formed of an array of juxtaposed equilateral, three-sided pyramidal projections. It is said that the tortuous path which a wave must follow in rolling up and down this revetment dissipates energy and may prevent the wave from rolling as far up the revetment as it otherwise might. Revetments of the form suggested by Harza are somewhat more effective in mitigating erosion and undermining than a flat seawall, but still leave room for improvement in terms of wave energy dissipation efficiency.

SUMMARY OF THE INVENTION

The present invention overcomes or mitigates the erosion problems of the prior art by providing a fluid wave energy dissipating and absorbing structure with a surface exposed to fluid wave action which is so designed as to absorb and dissipate more efficiently the energy of waves impinging upon it. Surfaces of structures formed in accordance with the present invention dissipate and absorb the energy of waves by redirecting the fluid over the points and edges of surface protrusions, by exposing a substantially increased surface area to the wave in comparison to flat seawalls and by providing an opportunity for wave cancellation. Waves striking a structure in accordance with the present invention are less likely to splash over it, thereby limiting erosion behind the structure as well as reducing the amount of erosion and undermining in front of the structure.

Additional objects and advantages of the invention will be set forth in part in the description which follows, and in part will be obvious from the description, or may be learned from the practice of the invention. The objects and advantages of the invention may be realized and attained by means of the instrumentalities and combinations particularly pointed out in the appended claims.

To achieve the objects and in accordance with the purpose of the invention, as embodied and broadly described herein, a fluid wave energy dissipating and absorbing structure in accordance with the present invention has at least one surface exposed to fluid wave action, said surface comprising an array of alternating three-sided pyramidal protuberances and triangular flat spaces, said protuberances and spaces being alternating in both rows and columns.

Broadly, methods of preventing or mitigating erosion caused by fluid wave action in accordance with the present invention comprise erecting on a surface subject to such erosion a fluid wave energy dissipating and absorbing structure, and forming on said structure at least one surface exposed to the eroding fluid wave action, said surface comprising an array of alternating three-sided pyramidal protuberances and triangular flat spaces as above described.

The accompanying drawings, which are incorporated in and constitute a part of this specification, illustrate several embodiments of the invention and, together with the description, serve to explain the principles of the invention.

BRIEF DESCRIPTION OF THE DRAWINGS

FIG. 1 is a plan view of a segment of the exposed surface of a fluid wave energy absorbing and dissipating structure in accordance with the present invention.

FIG. 2 is a side view of a seawall formed in accordance with the invention.

FIG. 3 is an enlarged view a portion of the surface shown in FIG. 1 with arrows indicating the redirection of fluid striking the surface.

FIG. 4 is a side view of a pier or piling protected by a fluid wave energy dissipating and absorbing structure in accordance with the invention.

FIG. 5 is a side view of the bank of a canal, river, lake or other inland water way protected by a wave energy dissipating and absorbing structure in accordance with the present invention.

DESCRIPTION OF THE PREFERRED EMBODIMENTS

Reference will now be made in detail to the presently preferred embodiments of the invention, examples of which are illustrated in the accompanying drawings wherein like parts are identified with like reference numbers.

As illustrated in FIG. 1, a fluid wave energy dissipating and absorbing structure in accordance with the present invention has at least one surface exposed to fluid wave action, the surface comprising an array of alternating three-sided pyramidal protuberances 1 and triangular flat spaces 2, the protuberances and spaces being alternating in both rows and columns.

Wave energy dissipating and absorbing structures in accordance with the present invention may take a number of forms, as shown in FIGS. 2, 4 and 5. As also shown in these Figures, energy dissipation is particularly effective when the altitudes of the pyramidal protuberances 1 are parallel to the surface of the source of the fluid waves 7.

Again with reference to FIG. 1, the optimum height and base dimensions of the three-sided pyramidal projections 1 and the intervening triangular flat spaces 2 depends on the wave energy and water volume to be encountered in a given geographical area and may be determined by those having ordinary skill in the art by use of wave tank experimentation along the lines detailed in Examples 1 through 3 below. Both the triangles and the bases of the pyramids are preferably equilateral triangles. The pyramidal projections are preferably equilateral tetrahedrons. As a general rule, the altitudes of the pyramidal projections will vary between about 1 and about 2.5 feet, with altitudes of 1.5 to 2 feet being particularly suitable.

The surface illustrated in FIG. 1 may be formed from any suitable material having strength sufficient to withstand the forces normally applied to the structure by the anticipated fluid wave action. In addition, the wave energy dissipating and absorbing surface may be supported by a supporting structure having strength sufficient to withstand the forces normally applied to the structure by the fluid wave action.

For example, a wave energy dissipating and absorbing structure in accordance with the present invention is illustrated in FIG. 2 in the form of a seawall 3 presenting pyramidal protuberances 1 to waves formed in fluid medium 7. The seawall 3 is supported by a truss structure 4, preferably made of metal, which is suitably anchored in the beach 5. Waves striking the wall 3 are dissipated as indicated by arrows, thereby preventing or mitigating splash over the wall and attendant erosion of the beach 5 behind the wall. Moreover, dissipation of the wave energy as illustrated in FIG. 2, prevents or mitigates erosion and undermining of the beach 6 in front of the wall.

Similarly, FIG. 5 depicts a bulkhead 11 protecting the bank 9 of a canal, river, lake or inland waterway, which bulkhead supports a wave energy dissipating and absorbing structure with exposed pyramidal protuberances 1 to dissipate the energy of waves formed in fluid medium 7. The wave dissipation structure and bulkhead may be suitably supported by, for example, a truss element 10, preferably made of metal, suitably anchored in the bank 9.

The use of the wave energy dissipating and absorbing structures in accordance with the present invention to protect piers and pilings is illustrated in FIG. 4. As there illustrated, a wave energy dissipating and absorbing surface in accordance with the present invention having exposed protuberances 1 to dissipate and absorb the energy of waves formed in fluid medium 7 is supported on a suitable backing 3 and directly attached to a pier or piling 8. The waves generated in fluid medium 7 in both FIGS. 4 and 5 may be either natural or induced by the passage of water craft.

Notwithstanding the foregoing illustrations, it is to be understood that the wave energy dissipating and absorbing surfaces of the present invention may also be formed as an integral or unitary portion of a revetment of conventional construction. In this regard, the pyramidal protuberances and intervening triangular flat spaces may be molded out of a suitable inorganic cementitious material, either as a unit or as appropriately shaped individual blocks.

The wave energy dissipating and absorbing surface may also be formed from molded synthetic resin material, which may include reinforcing materials in the form of fibers, woven fabrics, or non-woven fabrics. The reinforcing material may in turn be formed from high modulus filamentary material such as glass, boron, carbon, graphite, metal, etc. The synthetic resinous material may be any conventional thermoplastic or thermosetting molding resin capable of meeting the strength and durability requirements imposed by a given application and may contain conventional fillers and reinforcements. Exemplary resins include polyester, phenolic, epoxy and urethane resins, as well as styrene and other vinyl polymers, acrylonitrile-butadiene-styrene copolymers, polycarbonates, etc.

One advantage of structures formed in accordance with the present invention resides in their improved ability to dissipate and absorb wave energy, and thereby to prevent or mitigate erosion both in front of and behind the wave energy dissipating structure. Accordingly, erosion by wave action can be prevented or mitigated by erecting on a surface subject to such erosion a fluid wave energy dissipating and absorbing structure and forming on said structure at least one surface exposed to the eroding fluid wave action comprising an array of alternating three-sided pyramidal protuberances and triangular flat spaces as above described.

As illustrated in FIG. 3, the superior wave energy dissipating and absorbing efficiency of structures formed in accordance with the present invention is believed to be due to the diversion and redirection of water about the points and edges of the protuberances 1 and over the surface of the flat triangles 2, as illustrated by arrows in FIG. 3, as well as through wave cancellation. The superiority of the present invention to flat seawalls and to seawalls composed solely of juxtaposed three-sided pyramidal protuberances is illustrated by the following examples.

EXAMPLES 1-3

The experimentation herein described utilized the wave tank of the Physical Oceanographic Laboratory of the Marine Science Education Center of Mayport, Florida. This wave tank has an electrical paddle which was used to create waves of approximately 3 centimeters in height in a tank in which the water level was kept constant. In all three examples, scale model seawalls approximately 46 centimeters wide and approximately 8.65 centimeters high presenting differing wave absorbing surfaces to the generated waves were placed on a simulated sand beach in the wave tank. On a scale of 40 to 1, this represents a seawall approximately 7.35 feet in height.

In each instance a gradually sloping sand beach was constructed. The model seawalls were embedded in the sand beach to approximately half their height in a manner such that the still water level reached approximately the midpoint of the surface of the seawall model. The beach area behind the seawall was filled with sand to the top of the seawall.

Waves of approximately 3 centimeters in height were generated and the effect of wave action on the normal, gradual beach slope in front of the wall was observed. The volume of sand lost behind the seawall models from erosion caused by splashing over the wall was also observed.

In Example 1, the exposed surface of the seawall was a flat wall. After approximately 6½ hours, the condition of the beach slope in front of the wall was observed. Nearly all of the sand in the area in front of the wall had been removed by undissipated wave energy and some undermining of the wall was observed. Approximately 182 cubic centimeters of sand was lost per hour from behind the flat seawall due to erosion caused by splashing over the wall.

In Example 2, the exposed surface of the seawall model was an array of three-sided pyramidal protuberances similar to that illustrated in FIG. 1 with the exception that each intervening flat triangular space 2 illustrated in FIG. 1 was replaced by a three-sided pyramidal protuberance. The pyramidal protuberances were tetrahedrons having an altitude of approximately 1.73 centimeters and a base edge dimension of approximately 2 centimeters.

After approximately 5 hours in the wave tank as above described, approximately ½ of the sand forming the normal beach slope had been removed by undissipated wave energy. Moreover, more severe erosion to approximately ½ the depth of the remaining sand was observed along the base of the seawall model. One hundred seventy-five cubic centimeters of sand per hour was lost from behind the seawall model of Example 2 due to erosion caused by splashing over the wall.

In Example 3, a wave energy absorbing and dissipating structure in accordance with the present invention was employed. The pattern of pyramidal protuberances and triangular flat spaces was similar to that illustrated in FIG. 1. The triangles are equilateral triangles with a single side dimension of approximately 2 centimeters. The pyramids were tetrahedrons with a base edge dimension of approximately 2 centimeters and an altitude of approximately 1.73 centimeters. After eight hours in the wave tank as above described, the original slope of the beach in front of the wall was largely unchanged, although there was some observeable rearrangement of the sand. Moreover, erosion at the base of the seawall which had been particularly severe in Example 1 and, to a lesser extent, in Example 2 was limited to about ⅛ of the original sand depth. Only 116 cubic centimeters of sand per hour were lost from behind the seawall model of Example 3 due to erosion caused by splashing over the wall.

From the foregoing, it is apparent that the wave energy dissipating and absorbing structures of the present invention are substantially more efficient in dissipating the energy of waves impinging upon them, and this improved efficiency is manifested in an improved capability to prevent or mitigate erosion both in front of and behind the seawall structure.

It will be apparent to those skilled in the art that various modifications and variations can be made in the fluid wave energy dissipating and absorbing structures of the present invention and in the methods by which they may be used to prevent or mitigate erosion without departing from the scope or spirit of the invention. Thus, it is intended that the present invention cover the modifications and variations of this invention provided that they come within the scope of the appended claims and their equivalents.

What is claimed is:

1. A fluid wave energy dissipating and absorbing structure comprising a supporting structure bearing a fluid wave energy dissipating and absorbing surface, said supporting structure being affixed to a surface to be protected from fluid wave action, said wave energy dissipating and absorbing surface being exposed to fluid wave action and comprising an array of alternating three-sided pyramidal protuberances and triangular flat spaces, said protuberances and spaces being alternating in both rows and columns, said wave energy dissipating and absorbing surface being so disposed in relation to impinging fluid waves as to permit said protuberances and flat spaces to coact to dissipate and absorb the energy of impinging fluid waves.

2. A fluid wave energy dissipating and absorbing structure as defined in claim 1 wherein said surface is supported by a supporting structure having strength sufficient to withstand the forces normally applied to the structure by said fluid wave action.

3. A fluid wave energy dissipating and absorbing structure as defined in claim 1 and 2 wherein the bases of the protuberances and the open areas have the form of equilateral triangles.

4. A fluid wave energy dissipating and absorbing structure as defined in claim 1 and 2 wherein the protuberances are 1 to 2½ feet in altitude.

5. A fluid energy dissipating and absorbing structure as defined in claim 4 wherein the protuberances are about 1.5 feet in altitude.

6. A fluid wave energy dissipating and absorbing structure as defined in claim 4 wherein the protuberances are about 1.75 feet in altitude.

7. A fluid wave energy dissipating and absorbing structure as defined in claim 1 or 2 wherein said surface is formed from a molded synthetic resinous material.

8. A fluid wave energy dissipating and absorbing structure as defined in claim 7 wherein said surface is formed from reinforced molded synthetic resinous material.

9. A fluid wave-energy dissipating and absorbing structure as defined in claim 8 wherein said reinforcing material is formed from high-modulus filimentary material.

10. A fluid wave energy dissipating and absorbing structure as defined in claim 9 wherein the reinforcing material is a glass fabric.

11. A fluid wave energy dissipating and absorbing structure as defined in claim 2 wherein the supporting structure is in the form of a metallic truss.

12. A fluid wave energy dissipating and absorbing structure as defined in claim 11 wherein said surface is formed from molded, glass-reinforced synthetic resin material supported by said metallic truss.

13. A fluid wave energy dissipating and absorbing structure as defined in claim 1 or 2 wherein said surface is formed from molded inorganic cementitous material.

14. A fluid wave energy dissipating and absorbing structure as defined in claim 13 wherein said surface and said supporting structure are a unitary structure formed from inorganic cementitous material.

15. A fluid wave energy dissipating and absorbing structure as defined in claim 2 wherein said supporting structure is in the form of a seawall.

16. A fluid wave energy dissipating and absorbing structure as defined in claim 2 wherein said supporting structure is a pier or piling.

17. A fluid wave energy dissipating and absorbing structure as defined in claim 2 wherein said supporting structure is a bulkhead attached to the bank of a canal, river, lake or inland water way.

18. A fluid wave energy dissipating and absorbing structure as defined in claims 1 or 2 wherein the altitudes of the protuberances are parallel to the surface of the source of the fluid waves.

19. A method of preventing or mitigating erosion caused by fluid wave action comprising erecting on a surface subject to such erosion a fluid wave energy dissipating and absorbing structure, and forming on said structure at least one surface exposed to the eroding fluid wave action, said surface comprising an array of alternating three-sided pyramidal protuberances and triangular flat spaces, said protuberances and said spaces being alternating in both rows and columns.

20. A method according to claim 19 wherein the altitudes of the protuberances are parallel to the surface of the source of the fluid waves.

21. A fluid wave-energy dissipating and absorbing structure as defined in claim 9 wherein said reinforcing material comprises fibers.

22. A fluid wave-energy dissipating and absorbing structure as defined in claim 9 wherein said reinforcing material comprises woven fabric.

23. A fluid wave-energy dissipating and absorbing structure as defined in claim 9 wherein said reinforcing material comprises non-woven fabric.

* * * * *